United States Patent
Heusinger et al.

(10) Patent No.: US 8,888,404 B2
(45) Date of Patent: Nov. 18, 2014

(54) SPRAYING DEVICE FOR A CONSTRUCTION MACHINE AND A METHOD FOR OPERATING A SPRAYING DEVICE

(75) Inventors: Juergen Heusinger, Koblenz (DE); Andreas Nacke, Dessighofen (DE); Thorsten Joerig, Mermuth (DE)

(73) Assignee: BOMAG GmbH, Boppard (DE)

( * ) Notice: Subject to any disclaimer, the term of this patent is extended or adjusted under 35 U.S.C. 154(b) by 566 days.

(21) Appl. No.: 13/083,658

(22) Filed: Apr. 11, 2011

(65) Prior Publication Data
US 2011/0274491 A1   Nov. 10, 2011

(30) Foreign Application Priority Data

Apr. 14, 2010 (DE) .......................... 10 2010 014 904

(51) Int. Cl.
| | |
|---|---|
| E01C 21/00 | (2006.01) |
| E01C 23/088 | (2006.01) |
| E01C 23/06 | (2006.01) |
| E01C 23/12 | (2006.01) |
| E01C 19/17 | (2006.01) |
| B05B 12/02 | (2006.01) |
| B05B 12/04 | (2006.01) |
| B05B 15/02 | (2006.01) |
| B05B 1/16 | (2006.01) |
| A01B 77/00 | (2006.01) |

(52) U.S. Cl.
CPC .............. *E01C 23/088* (2013.01); *E01C 21/00* (2013.01); *A01B 77/00* (2013.01)
USPC ............ 404/111; 404/72; 404/84.05; 404/91; 239/106; 239/107

(58) Field of Classification Search
USPC ........ 404/72, 75, 83, 90–94, 101, 111, 84.05; 239/1, 11, 63, 66–70, 99, 100, 104, 239/106, 112, 113, 118, 146, 159, 163, 170, 239/172, 722, 754; 299/1.5, 1.9, 36.1, 39.1, 299/39.2, 81.1, 81.2
See application file for complete search history.

(56) References Cited

U.S. PATENT DOCUMENTS

| 3,782,634 A | 1/1974 | Herman |
| 4,990,025 A | 2/1991 | Young et al. |

(Continued)

FOREIGN PATENT DOCUMENTS

| DE | 2161705 A1 | 8/1972 |
| DE | 10213017 A1 | 10/2003 |

(Continued)

OTHER PUBLICATIONS

Espacenet, English Machine Translation of German Application No. DE10241067B3, published Apr. 22, 2004, retrieved from http://worldwide.espacenet.com on Mar. 28, 2014 (10 Pages).

(Continued)

*Primary Examiner* — Darren W Gorman
(74) *Attorney, Agent, or Firm* — Wood, Herron & Evans, LLP

(57) ABSTRACT

A spraying device for introducing a fluid into the working chamber of a construction machine for processing ground or road surfaces comprises at least one outlet nozzle by which the fluid is introduced into the working chamber, a line system by which the fluid is conveyed to the at least one outlet nozzle, and a control unit by which the fluid supply to the outlet nozzle is controllable. The present invention further relates to a construction machine for processing ground or road surfaces, especially a milling machine for milling off road or ground surfaces, a stabilizer for stabilizing ground of low bearing capacity and a recycler for repairing pavements in need of repair, comprising such a spraying device, and a method for operating a working device of such a construction machine.

22 Claims, 5 Drawing Sheets

(56) References Cited

U.S. PATENT DOCUMENTS

| | | | |
|---|---|---|---|
| 5,279,500 A * | 1/1994 | Perrin et al. | 404/75 |
| 5,385,426 A * | 1/1995 | Omann | 404/75 |
| 5,895,173 A | 4/1999 | O'Brien et al. | |
| 6,565,281 B2 | 5/2003 | Bruns et al. | |
| 6,802,464 B2 | 10/2004 | Marconnet | |
| 2003/0194273 A1 | 10/2003 | Lloyd | |
| 2005/0168048 A1 | 8/2005 | Gaertner et al. | |
| 2008/0129103 A1 | 6/2008 | Hall et al. | |
| 2008/0193215 A1 | 8/2008 | Rath | |
| 2009/0052987 A1 | 2/2009 | Hall et al. | |

FOREIGN PATENT DOCUMENTS

| | | |
|---|---|---|
| DE | 102 41 067 B3 | 4/2004 |
| EP | 0860551 A2 | 8/1998 |
| EP | 0 960 239 B1 | 12/1999 |

OTHER PUBLICATIONS

European Patent Office, European Search Report, Application No. 11004500.2, mailed May 7, 2012 (9 pages).

Espacenet, English Machine Translation of German Application No. DE2161705A1, published Aug. 10, 1972, retrieved from http://worldwide.espacenet.com on Mar. 28, 2014.

Espacenet, English Machine Translation of German Application No. DE10213017A1, published Oct. 9, 2003, retrieved from http://worldwide.espacenet.com on Mar. 28, 2014.

* cited by examiner

SPRAYING DEVICE FOR A CONSTRUCTION MACHINE AND A METHOD FOR OPERATING A SPRAYING DEVICE

The present application claims priority under 35 U.S.C. §119 of German Patent Application No. 10 2010 014 904.7, filed Apr. 14, 2010, the disclosure of which is hereby incorporated herein by reference in its entirety.

FIELD OF THE INVENTION

The present invention relates to a spraying device for introducing a fluid into the working chamber of a construction machine for processing ground or road surfaces, a construction machine with such a spraying device and a method for operating a spraying device of such a construction machine.

BACKGROUND OF THE INVENTION

The present invention is used in construction machines for processing ground or road surfaces, especially in a milling machine for milling road and ground surfaces, in a stabilizer for stabilizing ground of low bearing capacity and in a recycler for repairing pavements in need of repair. A generic construction machine is known for example from EP 0 960 239 B1. Such construction machines are provided with a working roller, with which the ground or the road surface can be broken open and/or thoroughly mixed. If processing relates to an asphalt or concrete road surface, a typical working process is milling off the road surface. The working roller is held horizontally with respect to its cylinder axis directly or indirectly on a machine frame of the construction machine and extends transversely to the longitudinal direction of the construction machine. The working roller is covered by a protective hood that encloses a working chamber in its interior in which the working roller will rotate in working operation. The working chamber is open towards the ground, so that the working roller can come into contact with the ground to be processed. The hood thus prevents the material milled off by the working roller rotating about its longitudinal axis from being ejected in an uncontrolled manner into the ambient environment of the construction machine. The working chamber, which is externally delimited by the hood, is further used for material transport in order to enable the removal of the material milled off by the milling roller in a controlled manner for example. It can be a further application of the working chamber to use said chamber as a mixing chamber in which the processed ground material can be mixed with an additive in order to achieve fixing or stabilization of the ground. Typical additives are hydraulic or bituminous bonding agents or water for example.

For this reason, a generic construction machine comprises a spraying device, with which a fluid can be introduced into the working chamber of the construction machine. The spraying device comprises at least one outlet nozzle for this purpose, through which the fluid is introduced into the working chamber. Furthermore, a line system is provided via which the fluid is guided to the at least one outlet nozzle. A further important element is finally a control unit, by means of which the fluid supply to the outlet nozzle can be controlled. The control unit thus represents the central control component of the spraying device and is responsible for the control of the spraying device and the individual components of the spraying device. The control unit can comprise a respectively programmed microcontroller for example which triggers the respective components of the spraying device by way of suitable signal connections. Typical control functions are the activation and deactivation of the fluid supply for example, the regulation of the fluid pressure and the fluid quantity per unit of time which exits through the at least one outlet nozzle, the type of fluid, etc.

It is possible to introduce fluid from the outside into the interior of the protective hood or the working chamber via the at least one outlet nozzle. The construction machine comprises a respective line system for this purpose which guides the fluid to the at least one outlet nozzle. The line system can comprise one or several respective fluid storage reservoirs for this purpose, for example, which are arranged to be integrated in the construction machine. It is alternatively possible to ensure the supply with fluid via a respective supply vehicle such as a tanker truck that is connected to the line system of the construction machine and moves together with the operational construction machine. The line system can optionally comprise further components such as one or several pumps, via which the fluid is pumped from the storage reservoir to the line system and finally to the at least one outlet nozzle, filter, etc.

A typical application in which the introduction of a fluid into the working chamber of the construction machine is desired is the mixture of the material processed by the working roller in the working chamber with water in order to achieve improved material properties of the ground material together with bonding agents previously applied to the ground to be processed such as lime for example. Alternatively, the formation of dust during processing can also be reduced by wetting the ground material for example. Further exemplary applications are the introduction of bituminous bonding agents, the production and introduction of foamed bitumen, etc.

It has been noticed in practical application of such construction machines with a spraying device that the at least one outlet nozzle of the spraying device is frequently clogged by the processed material. This prevents any further controlled introduction of a fluid into the working chamber. This is especially unsatisfactory for the reason that the cleaning of the at least one outlet nozzle is comparatively time-consuming and causes long standstill times for the construction machine.

A modified outlet nozzle with a triggerable closing device is known for this reason from DE 102 41 067 B3, by means of which a journal can be moved into the outlet nozzle in order to enable the ejection of material present in the at least one outlet nozzle and to achieve free passage in the at least one outlet nozzle. As long as the outlet nozzle is not in operation, the opening of the outlet nozzle can be further sealed with the journal so that no ground material can penetrate the outlet nozzle. The closing device as described there for an outlet nozzle has a comparatively complex configuration and comprises a plurality of movable and immovable parts, so that it requires a fair amount of maintenance work. Moreover, the spraying device as described there represents a considerable cost factor as a result of its complexity.

It is therefore the object of the invention to improve the spraying device of a generic construction machine in the respect that it effectively prevents the clogging of the at least one outlet nozzle in a simple and comparatively cost-effective manner and especially requires a low amount of maintenance at the same time.

SUMMARY OF THE INVENTION

One relevant aspect of the present invention is that the control unit is arranged in such a way that it controls a cleaning function of the at least one outlet nozzle in such a way that a fluid blast for cleaning exits in intervals through the at least one outlet nozzle into the working chamber. The cleaning of the at least one outlet nozzle is thus not achieved via a mechanical element such as the journal of a respective closing device, but by a fluid blast guided through the at least one outlet nozzle. A fluid blast shall especially be understood below as being the brief and sudden guidance of a fluid through the at least one outlet nozzle. With the fluid blast, the fluid thus reaches the at least one outlet nozzle under a comparatively high pressure for a short moment and thus ejects material out of the opening of the outlet nozzle into the working chamber, which material may be present and which may block the at least one outlet nozzle, and entrains any deposited material which partly blocks the at least one outlet nozzle. As a result, the arrangement of the outlet nozzle in the manner that a separate mechanically movable part needs to be present in order to achieve a cleaning of the outlet nozzle is no longer necessary. The relevant aspect for the cleaning function is thus the special arrangement of the control unit which is arranged for controlling the cleaning function of the at least one outlet nozzle.

A further important aspect of the present invention is that the fluid blast is triggered not only once or by hand if required. It is rather provided in accordance with one embodiment of the present invention that fluid blasts are produced in intervals for cleaning purposes. In intervals shall designate a process that is repeated regularly over time, with an interval comprising both the duration of the fluid blast itself and also the period between two successive fluid blasts. The control unit is therefore arranged in accordance with one embodiment of the present invention in such a way that it triggers a fluid blast through the outlet nozzle regularly or in regular time intervals. Under the condition that the cleaning function is not explicitly deactivated, the triggering of the fluid blast by the control unit further occurs automatically, so that the cleaning function can run in the background without the machine operator always having to trigger an individual fluid blast for example.

Although it is principally possible to activate the cleaning function in a regularly activated spraying device, i.e. in an operating mode in which fluid is introduced in such a quantity into the working chamber in order to change a property of the ground, the advantageous properties of the present invention will be noticed especially when the cleaning function is triggered by the control unit when the "spraying function" is switched off or the spraying device is switched off and the machine operator does not wish to supply fluid in any noteworthy quantities to the ground to be processed. In other words, the control unit is arranged in this embodiment in the manner that the cleaning function (at least when the spraying function is deactivated) will run automatically and continuously in the background of machine operation. The quantity of fluid which exits per fluid blast into the working chamber through the at least one outlet nozzle is so low that it has no influence on the material properties of the material which is to be processed and is disposed in the working chamber. The quantity of fluid which reaches the working chamber per fluid blast is substantially smaller than the fluid quantity which is introduced into the working chamber when the spraying function is activated. The quantity of fluid which reaches the working chamber during the cleaning function as a result of the fluid blasts per unit of time is therefore negligible and has no influence on the ground properties for example.

It is principally possible that the control unit is arranged in the manner that the cleaning function starts automatically upon the start-up of the working device and runs in the background over the entire period of operation of the working device. It is preferable however, in one embodiment, to arrange the control unit in the manner that it controls the cleaning function on the at least one outlet nozzle depending on the operating state of the at least one outlet nozzle. In this embodiment, the control unit will thus detect when the spraying device or the spraying function is activated and when it is deactivated. In the deactivated state of the at least one outlet nozzle, which means whenever no fluid is to be introduced into the working chamber, the at least one outlet nozzle is especially susceptible to clogging by ground material. It is therefore preferable in accordance with the present invention that the control unit is arranged in the manner that it automatically triggers the cleaning function at least in the deactivated state of the outlet nozzle. Once the spraying function has been switched off or the introduction of fluid into the working chamber is no longer provided, the control unit will activate the cleaning function in this embodiment, as a result of which fluid blasts are triggered in the outlet nozzle in intervals. Further preferred control units allow further possibilities to choose whether the cleaning function should be activated at all, whether the cleaning function should also be activated during the regular spraying operation of the outlet nozzle, and/or whether the cleaning function should only be activated when the outlet nozzle is in the deactivated state or when no fluid is to be introduced into the working chamber.

It is understood that the length of the fluid blast triggered by the control unit can vary. The cleaning of the at least one outlet nozzle with a fluid blast will be achieved especially well when the length of the fluid blast is in the range of between 0.1 and 30 seconds, especially between 1 and 10 seconds, and particularly between 2 and 15 seconds. A further quantity which has a relevant influence on the cleaning result of the cleaning function is the time interval between two successive fluid blasts. Optimal cleaning results are achieved when the control unit is arranged in the manner that the time interval between two successive fluid blasts is in the range of between 5 seconds and 5 minutes, especially between 10 seconds and 3 minutes, and particularly between 20 seconds and 1 minute.

The extent of the risk to which the outlet nozzle will be clogged by material to be processed depends among other things on the nature of the ground material to be processed. There are ground materials where the at least one outlet nozzle is clogged very quickly, and other ground materials which hardly tend towards clogging the at least one outlet nozzle and such which do not tend towards clogging at all. In order to compensate these individual differences in the ground material, it has proven to be advantageous to arrange the control unit in the manner that it comprises at least one controllable parameter which can be adjusted to the tendency of the ground to clog the at least one outlet nozzle. It is therefore provided in a preferred embodiment that at least one of the parameters of "length of fluid blast for cleaning", "time interval between two successive fluid blasts", "fluid pressure during a fluid blast" or "used fluid during the fluid blast" is controllable in the control unit. A machine operator is then able to adjust the settings in the control unit during the operation of the construction machine to the respective ground properties and/or the respective working operation.

The cleaning function can be achieved by way of a large number of different fluids such as gaseous fluids, especially compressed air, or liquid fluids. The use of liquid fluids is preferable for producing the fluid blast. In particular, the fluid used for generating the fluid blast concerns a fluid, especially a hydraulic bonding agent or a bonding agent suspension, and especially water. Water comes with the big advantage that in very low quantities the disturbance to the ground material to be processed is very low and a certain residual humidity is present anyway in the ground material to be processed.

Although it is principally possible that other fluids such as foamed bitumen or the like are used for triggering the fluid blast, it is simpler to arrange the control unit in the manner that it controls the cleaning function in such a way that the fluid for triggering the fluid blast of the cleaning function is always water. Once the control unit has initiated the cleaning function, it uses the respectively provided water supply of the outlet nozzle. This embodiment is advantageous in the respect that a change or setting of the fluid to be performed by the machine operator is no longer necessary. Moreover, generic construction machines frequently have at least a minimum quantity of water which can be used for the cleaning function, or are at least connectable for example to a water tanker for performing the cleaning function.

It is further preferable if the control unit activates the cleaning function only when the fluid supply is ensured. A respective sensor can be provided for this purpose for example which checks the presence of water in a storage reservoir or an adequate connection with a tanker etc. If the supply with fluid is not ensured, the control unit can trigger a respective notification signal such as the illumination of warning lamp, etc.

The spraying device can comprise merely one single outlet nozzle which supplies fluids to the working chamber. Embodiments of the spraying device are preferred however which comprise more than at least one outlet nozzle in order to enable a more even fluid introduction into the working chamber, especially over its entire width. The provided outlet nozzles are arranged for this purpose in rows for example, preferably in at least one row parallel to the longitudinal axis of the working roller.

In the event that the spraying device comprises at least one further outlet nozzle in addition to the at least one outlet nozzle, the control unit is preferably arranged in the manner that it also detects the at least one further outlet nozzle or all provided outlet nozzles with the cleaning function. The potential clogging of an outlet nozzle with the ground material to be processed is usually not limited to a specific position in the working chamber. It is thus also advantageous to detect several, and especially all, of the provided outlet nozzles with the cleaning function in order to prevent any clogging of an outlet nozzle in the working chamber.

It is principally possible that the provided outlet nozzles are triggered in their entirety jointly, or simultaneously and together, by the control unit. If the control unit triggers the cleaning function in this embodiment, the cleaning function extends to all outlet nozzles. It is alternatively also possible that the cleaning unit for controlling the cleaning function triggers the provided outlet nozzles individually. In this embodiment, the control unit is able to trigger a fluid blast individually and independently of the other outlet nozzles in each of the provided outlet nozzles. This embodiment comes with the advantage that an inactive part of the provided outlet nozzles for example can be subjected to the cleaning function in a purposeful manner, whereas the active part of the outlet nozzles is not included in the cleaning function.

Individual triggering of all outlet nozzles can be relatively complex, depending on the embodiment. In order to still enable an at least approximately individualized control of the cleaning function of the outlet nozzles, it is provided in a further preferred embodiment that the control unit for controlling the cleaning function triggers the provided outlet nozzles in groups. One group is formed by at least two outlet nozzles each. This embodiment is thus characterized in that it triggers outlet nozzles organized in groups for the cleaning function.

Embodiments are also possible in which the control unit is arranged in the manner that it triggers all provided outlet nozzles jointly for controlling the cleaning function. When the control unit triggers a fluid blast in this embodiment within the scope of the cleaning function, it extends simultaneously over all of the provided outlet nozzles. This embodiment is advantageous in the respect that the control unit can be arranged in a comparatively simple way.

In a further embodiment, the line system comprises a water beam on which at least two outlet nozzles are arranged. A water beam shall be understood in the present case as being a supply tube which is guided substantially parallel to the longitudinal axis of the cylindrical working roller, on which at least two outlet nozzles are arranged. It can be provided in this embodiment that the control unit does not trigger the outlet nozzles directly, but indirectly via the control of the water beam. The water beam thus represents a central line section which supplies at least two outlet nozzles with fluid, especially water. Several outlet nozzles can be triggered in a grouped manner in a constructional comparatively simple way via a control of the fluid supply of the two outlet nozzles by a control of the water beam.

Numerous variants are principally possible as to how the control unit concretely controls the fluid supply of the at least one outlet nozzle or the triggering of the fluid blast. It is possible for example to activate and deactivate a pump connected to the line system in intervals for the cleaning function. An embodiment is preferred however in which at least one valve is present, especially directly before the at least one outlet nozzle, which is triggered by the control unit within the scope of cleaning function. Valves, and especially fluid valves, can be realized in a comparatively simple way and allow maintaining the pressure in the line system up to the valve before the output nozzle. A fluid blast can be produced in a comparatively simple way by opening the valve in intervals. It is especially effective when the valve is arranged directly before the outlet nozzle between line system and outlet nozzle because in this case the pressure drop between the valve output and the opening of the outlet nozzle is especially low.

Several alternatives can be used concerning the arrangement of one or several valves. It is therefore possible for example to arrange the valve in the manner that simultaneously several outlet nozzles are covered by a fluid blast. It is advantageous however if each of the provided output nozzles is provided upstream with one valve each, ideally directly in front of the same. An especially wide spectrum of control alternatives is obtained for this embodiment in the event that the control unit is further arranged in the manner that it triggers each valve separately.

If more than at least one outlet nozzle is provided, it is further possible to arrange the control unit in the manner that it triggers the fluid blast simultaneously for the at least two outlet nozzles or simultaneously for all provided outlet nozzles. It is preferable however if the provided at least two outlet nozzles are triggered in a rolling manner by the control unit for triggering a fluid blast. This helps to prevent an excessive pressure drop in the line system for example, so that the efficiency and reliability of the cleaning effect of each fluid blast is ensured. The at least two outlet nozzles are thus triggered by the control unit in this embodiment in an alternating fashion for performing the cleaning effect and for triggering a fluid blast. Rolling shall be understood in the sense that the respective fluid blast is triggered in the provided output nozzles in a repetitive and alternating manner and in a specific sequence by the control unit.

It is understood that the control unit can also be arranged in the manner that it triggers respective subgroups of the provided outlet nozzles in an alternating fashion. It is especially preferred in one embodiment to arrange the control unit in a controllable manner with respect to the triggering of the number of the outlet nozzles per fluid blast. It is therefore possible for example to increase the frequency of the fluid blasts in problematic areas or in areas where clogging of the provided at least one outlet nozzle occurs especially frequently in comparison to other regions where clogging of the provided at least one outlet nozzle does not occur so frequently, or to adjust the cleaning function to the conditions prevailing individually in the working chamber.

A further aspect of the present invention lies further in a construction machine for processing ground or road surfaces, especially a milling machine for milling off road and ground surfaces, a stabilizer for stabilizing ground of low bearing capacity and a recycler for repairing pavements in need of repair, comprising a spraying device in accordance with the present invention. It is a common aspect in these different types of construction machines that they each comprise a horizontal working roller arranged transversely to the longitudinal axis of the construction machine, which are used in a rotating manner in relation to processing the subsurface, i.e. soil, concrete road surface etc for example. The space around the working roller is closed off to the outside by a cover or protective hood (designated below simply as a "hood"), so that a working chamber is formed towards the ground which is used for example for the thorough mixture of the ground to be processed with additives, fluids etc. This working device is arranged directly or indirectly on the machine frame of the construction machine. The construction machine is preferably arranged in a self-propelled manner and comprises at least one front wheel and at least two rear wheels which may comprise respective hydraulic motors for example. Arrangements with respective drive caterpillars are alternatively also possible. For the supply with fluid the construction machine can further comprise either at least one fluid storage reservoir for carrying the fluid or, alternatively, it can be connected via the line system with a tank vehicle or the like for the fluid supply of the spraying device.

A further aspect of the present invention lies in a method for operating a working device of a construction machine, especially a construction machine of the embodiment as mentioned above. It is provided in accordance with the present invention that the method provides at least the triggering of a fluid blast by the control unit for cleaning at least one outlet nozzle and the repetition of this step after the expiration of a fixed time interval. In other words, the fluid blast is triggered in a cycled manner in accordance with the invention, so that there is always a fixed time interval between two successive fluid blasts. A fluid blast is characterized in that fluid is guided for a comparatively short period of time under a comparatively high pressure by the line system through the at least one outlet nozzle into the working chamber. At the beginning of the fluid blast, the pressure of the fluid guided to the outlet nozzle thus rises suddenly and drops suddenly again back to the initial level at the end of the fluid blast.

Preferred embodiments of the method in accordance with the present invention provide the steps of "checking whether the at least one outlet nozzle is inactive" and "triggering the fluid blast of the cleaning function by the control unit" only whenever the at least one outlet nozzle is inactive. In this method in accordance with the invention, the cleaning function is thus only performed when the outlet nozzle is not used for the regular supply of a fluid to the working chamber. In particular, the likelihood of clogging of outlet nozzle is highest in this operating state.

It is further possible that every outlet nozzle is triggered individually by the control unit in the method in accordance with the present invention. This allows for example that the cleaning function is triggered in a rolling or alternating and successive manner in the provided outlet nozzles by the control unit. It is also possible however to arrange the control unit in the manner that it simultaneously triggers the fluid blast in at least two outlet nozzles or groups of outlet nozzles. It is understood that also several subgroups can be supplied in a rolling manner with a fluid blast by the control unit.

BRIEF DESCRIPTION OF THE DRAWINGS

The present invention will be explained below in closer detail by reference to several embodiments schematically shown in the drawings, wherein.

DETAILED DESCRIPTION OF THE INVENTION

Figure 1:
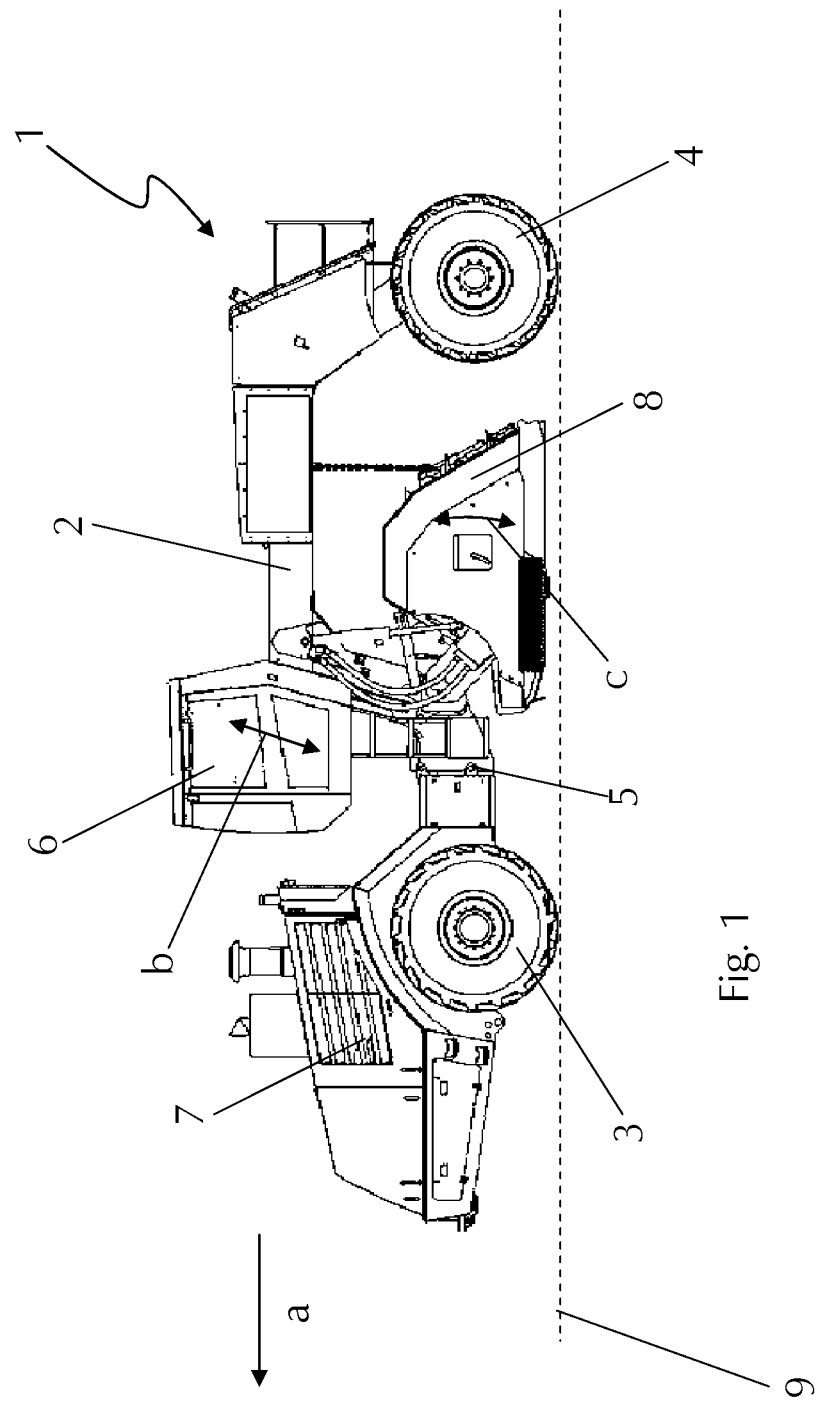
FIG. 1 shows a side view of a generic construction machine.

The side view of FIG. 1 shows a construction machine 1, specifically a so-called stabilizer or recycler, which depends on the respective application. The relevant elements of the construction machine 1 are a machine frame 2, a pair of front wheels 3 and a pair of rear wheels 4, with merely the wheel disposed on the left side being visible. The machine frame 2 is further arranged with two elements and comprises a knee-joint connection 5 for connecting the two elements, which knee-joint connection is arranged beneath the driver's cabin 6 which is height adjustable in the direction of arrow b. A drive apparatus 7 is further provided which provides drive power for driving the construction machine 1 and the working device which will be explained below in closer detail.

The construction machine 1 is used for processing ground and road surfaces and comprises the working device in form of a working roller for this purpose. The working roller is indirectly held on the machine frame 2 of the construction machine 1 to be rotatable about its cylinder axis and is enclosed by a hood 8 which closes off the space around the working device at the top and to the sides. The hood 8 is arranged openly in a downward manner and towards the ground 9. The hood 8 thus encloses a working chamber in which the working roller is held. The working roller (covered in FIG. 1 by the hood 8) is height-adjustable relative to the hood 8 and to the machine frame in the direction of arrow c and comprises a respective adjusting device for this purpose. The working roller is in the upper position as shown in FIG. 1 and is not in contact with the ground 9 to be processed. This position of the working roller is assumed for example in the transport mode of the construction machine 1, whereas the working roller is lowered downwardly in the working mode or ground processing mode and presses into the ground in the depth as desired. The construction machine is moved in the direction of arrow a (forward direction) over the ground 9.

Figure 2:
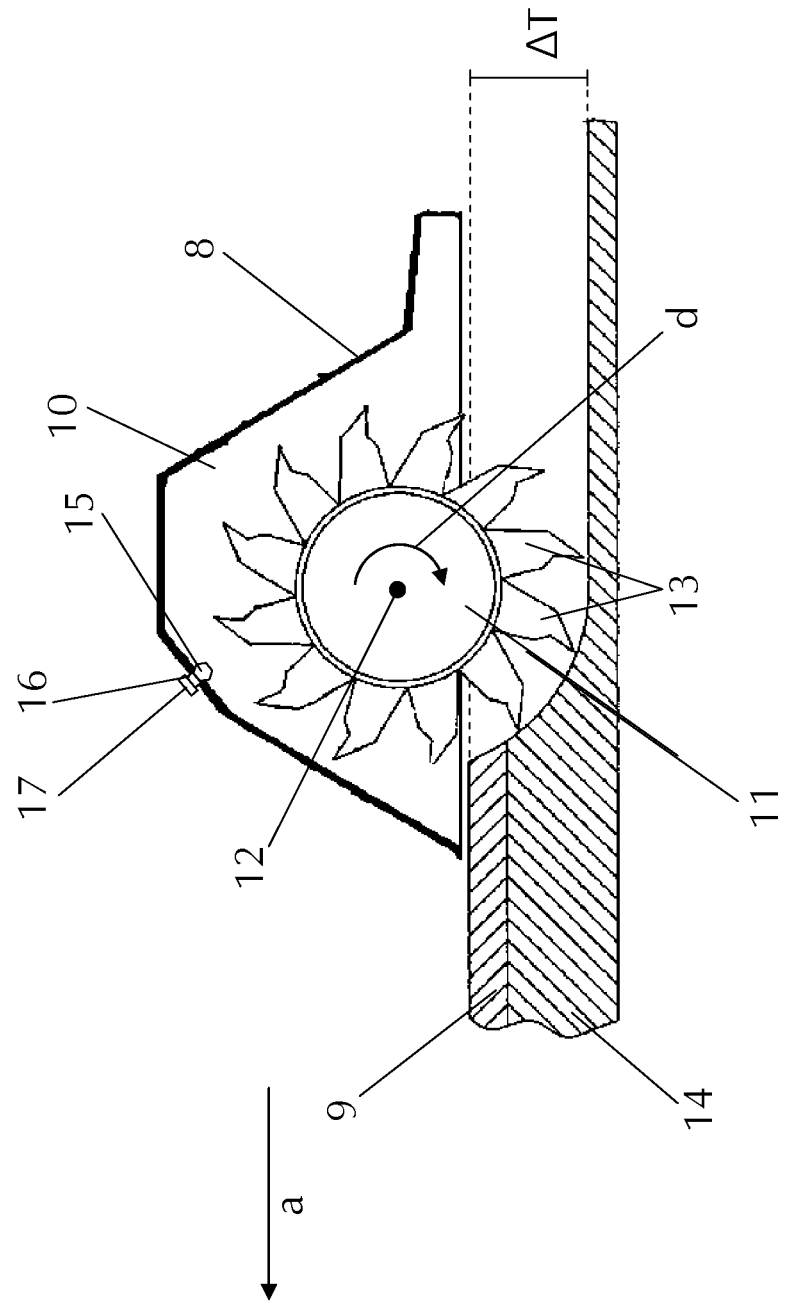
FIG. 2 shows a sectional side view of the working chamber of the construction machine of FIG. 1.

The concrete configuration of the working chamber 10, which is covered in a bell-like manner by the hood 8, is shown in closer detail in the sectional view according to FIG. 2. Hood 8 therefore encloses the working chamber 10 upwardly and towards the sides. Hood 8 is provided with an open arrangement in a downward direction and in the direction towards the ground 9 of the road, so that the working roller 11 which is enclosed by the hood 8 can be brought into contact with the ground 9 to be processed by lowering the working roller 11. The working roller 11 is arranged in the interior of hood 8. The longitudinal axis 12 of the working roller 11 extends horizontally and perpendicularly to the direction of movement a of the construction machine 1. A plurality of teeth 13 are arranged specifically by way of tool-changing holder system on the outside of the cylindrical working roller 11. The working roller 11 rotates about its cylinder axis 12 in the direction of arrow d, i.e. in the opposite direction to the direction of movement of the construction machine 1. The working roller 11 thus removes ground material in the depth ΔT, comprising the ground 9 of the road and a part of the underlying substructure 14.

An outlet nozzle 15 which is connected via a valve 16 to a line system 17 protrudes from the outside into the working chamber 10 which is delimited to the outside by the hood 8. The line system 17 further comprises a water reservoir which is either held on the construction machine 1 (not visible) or is part of a separate tanker (not shown) (the line system 17 includes in this case the entire line apparatus up to suitable connecting means to the tanker; in other words, the line system 17 comprises for this concrete embodiment no separate water reservoir but is connected with an external water reservoir by a suitable connecting means), and a pump (not shown) which can convey the water from the storage reservoir via the line system 17 to the outlet nozzle 15. The pump is further arranged in the manner that it pressurizes the line system 17. When valve 16 is accordingly briefly opened, a fluid blast will develop and fluid will pass through the valve 16 from the line system into the outlet nozzle 15 and finally reaches the working chamber 10 via the outlet nozzle 15. Any ground material that may be disposed in the outlet nozzle 15 is removed by this fluid blast and is ejected or entrained into the working chamber 10. The outlet nozzle 15, valve 16, line system 17, the pump and the water reservoir are part of a spraying device in the construction machine which allows the introduction of a fluid, specifically of water, into the working chamber 10. The principal configuration of the spraying device of FIG. 2 is shown in closer detail in FIG. 3.

Figure 3:
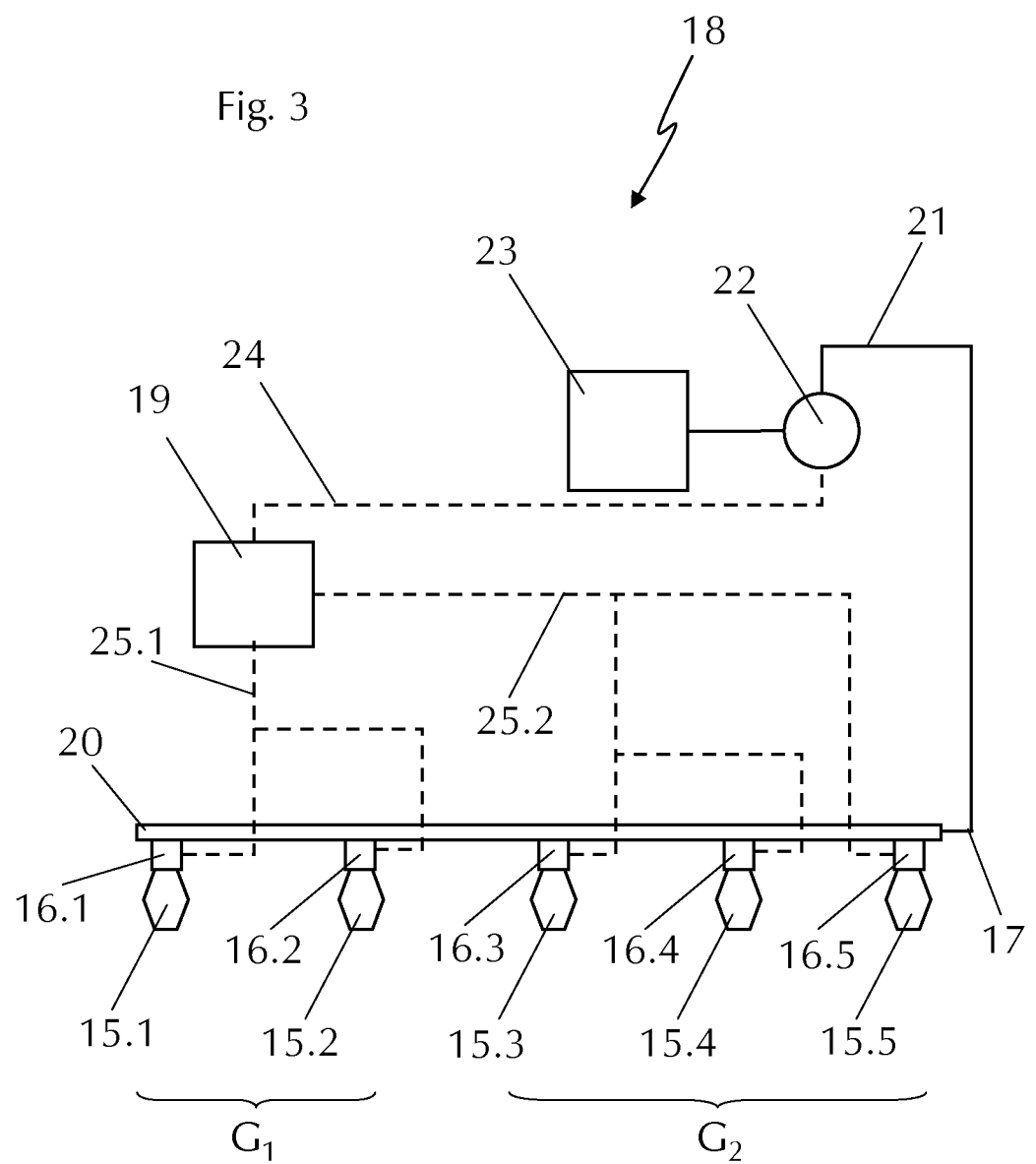
FIG. 3 shows the structure of a spraying device according to a first embodiment.

The control unit 19 is the central element of the spraying device 18 of FIG. 3. It coordinates the individual functions of the spraying device 18, especially the spraying function and the cleaning function. The spraying device 18 comprises five outlet nozzles 15.1, 15.2, 15.3, 15.4 and 15.5 in addition to the control unit 19, which are able to spray fluid into the working chamber 10 with their end facing downwardly in FIG. 3. For this purpose, the outlet nozzles 15.1 to 15.5 are each connected via a valve 16.1, 16.2, 16.3, 16.4 and 16.5 with the line system 17. The line system 17 comprises a water beam 20 which is in fluidic connection with the outlet nozzles 15.1 to 15.5 via the respective valves 16.1 to 16.5. Water beam 20 is connected via a line 21 with a pump 22 which is able to pump fluid, which is water in this case, from a storage reservoir 23 into line 21 of the line system 17. The pump 22 and the valves 16.1 to 16.5 are connected via the control connections 24 (between the control unit 19 and the pump 22) and 25.1 (between the control unit 19 and the valves 16.1 and 16.2) and 25.2 (between the control unit 19 and the valves 16.3, 16.4 and 16.5), via which the control unit 19 can activate and deactivate pump 22 and can also open and close the valves 16.1 to 16.5.

When the construction machine 1 is in working operation (which means the working roller 11 is rotating and removes ground material), the removed material is disposed in the working chamber 10 of FIG. 2. This material can clog the outlet opening of the output nozzle 15. In order to prevent this, the control unit 19 in FIG. 3 is arranged in such a way that it can trigger a cleaning function. The pump 22 is activated by the control unit 19 at first until a predetermined fluid pressure is reached in the line system 17. If the fluid pressure in the line system drops beneath this predetermined value, the control unit 19 reactivates pump 22 again. The sensor system provided for this purpose is not shown in closer detail in FIG. 3. The cleaning function is arranged such that the control unit triggers a fluid blast in intervals which pushes through the outlet nozzles 15.1 to 15.5. In certain intervals, a small portion of the fluid in line system 17 reaches the associated outlet nozzle 15 by opening of the respective valves 16 and thus the working chamber 10. The control unit 19 in FIG. 3 triggers the provided valves in groups. The valves 16.1 and 16.2 are triggered jointly via the control connection 25.1. The valves 16.3, 16.4 and 16.5 on the other hand are opened and closed jointly via the control connection 25.2 by the control unit 19. In certain regular intervals, the control unit opens the valves 16.1 and 16.2 (=group 1) and 16.3, 16.4 and 16.5 (=group 2) in an alternating fashion. The control unit 19 thus ensures that not all of valves 16.1 to 16.5 are opened simultaneously for the cleaning function, which otherwise leads to a relatively high pressure drop in the line system 17. Rather, a subgroup G1 or G2 of the valves is activated by the control unit. Accordingly, a fluid blast simultaneously passes the outlet nozzles 15.1 and 15.2 or simultaneously passes the outlet nozzles 15.3, 15.4 and 15.5.

A further embodiment not shown in closer detail in the drawings is arranged in such a way that each valve 16.1 to 16.5 of FIG. 3 has a separate or individual functional connection with the control unit 19. It is thus possible to individually trigger the individual outlet nozzles 15.1 to 15.5 to perform the cleaning function. The control unit in this embodiment is arranged in the manner for example that the valves 16.1 to 16.5 are opened in a rolling manner by the control unit 19, which means successively or cyclically. Accordingly, a fluid blast is produced in each outlet nozzle 15.1 to 15.5 individually and successively. Starting with the outlet nozzle 15.1 for example, each further outlet nozzle 15.2 to 15.5 would be triggered subsequently one after the other by the control unit 19 for triggering a fluid blast via the respectively upstream valve (thus 15.2 as the next one, then 15.3, then 15.4 and then 15.5). Once all outlet nozzles 15.1 to 15.5 (or the respectively upstream valve 16.1 to 16.5) have been triggered once by the control unit 19 or if a fluid blast has been triggered in each outlet nozzle 15.1 to 15.5, the control unit 19 of this embodiment is arranged in the manner that it starts right from the beginning again, which means on valve 16.1 or outlet nozzle 15.1, and respectively repeats the process over the entire period of the activated cleaning function.

Figure 4:
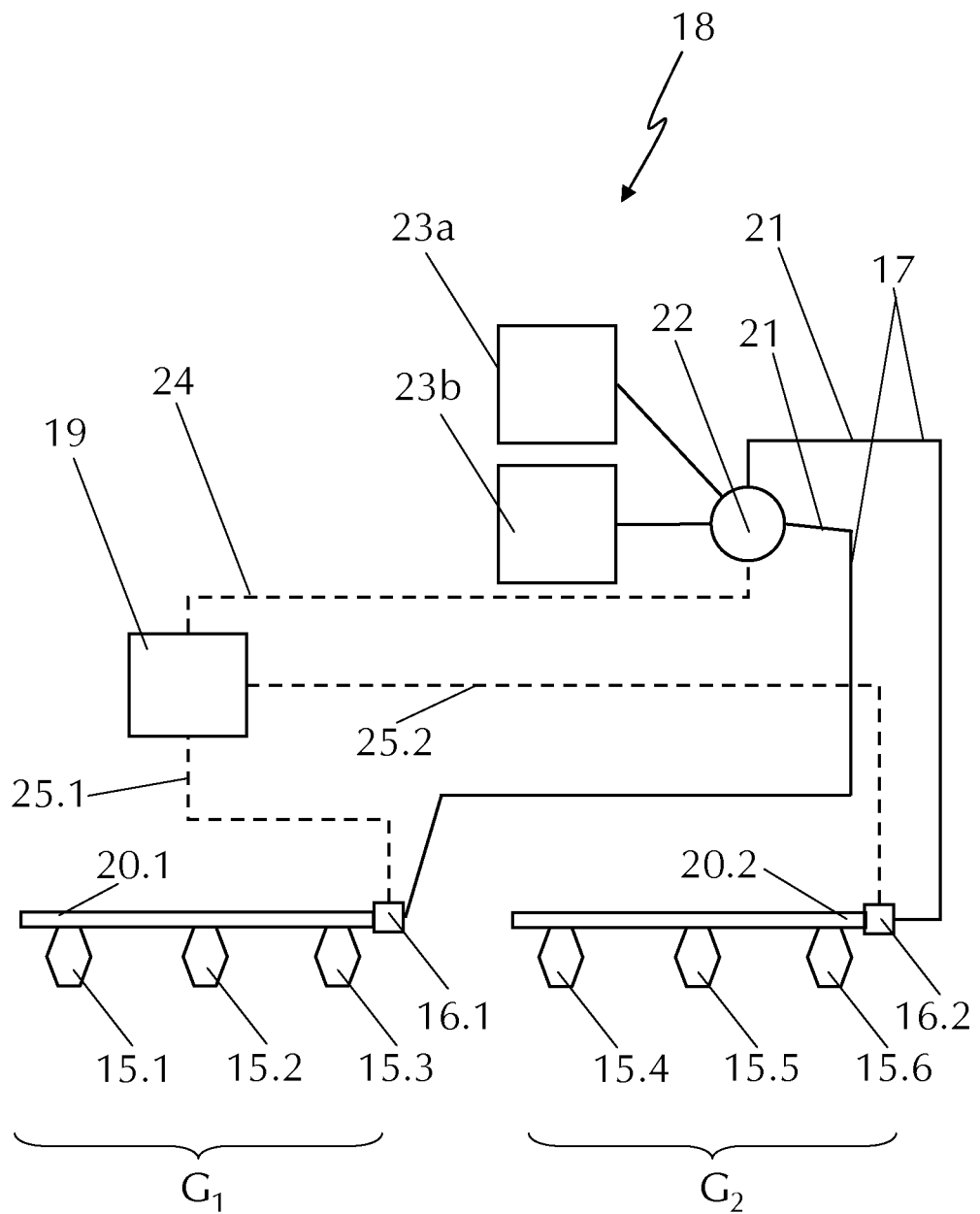
FIG. 4 shows the structure of a spraying device according to a second embodiment.

FIG. 4 shows a further alternative arrangement of the spraying device 18. One relevant difference is that the spraying device comprises two storage reservoirs 23a and 23b. Pump 22 can now be controlled by the control unit 19 in the manner that it pumps either the fluid contained in the storage reservoir 23a or the fluid contained in the storage reservoir 23b into the line system 17. Depending on the setting, the control unit 19 chooses in the embodiment according to FIG. 4 whether the fluid blast is produced by the fluid contained in the storage reservoir 23a or by the fluid contained in the storage reservoir 23b. It is also possible to provide a setting of the control device 19 in that for the cleaning function it always uses fluid from one of the storage containers 23a or 23b or, in a further alternative embodiment, uses an external fluid supply such as a water tanker for example.

A further special aspect in the embodiment according to FIG. 4 is that the outlet nozzles 15.1 to 15.6 are already connected in a grouped fashion to the line system 17 or specifically to one water beam 20 per group. The outlet nozzles 15.1 to 15.3 are therefore connected directly to the water beam 20.1 and jointly form the group G1. The group G2 comprises the outlet nozzles 15.4, 15.5 and 15.6, which are directly jointly connected to the second water beam 20.2 and form in their entirety the group G2. Both water beams 20.1 and 20.2 respectively comprise a valve 16.1 and 16.2 which are in fluidic connection with the pump 22 via separate line systems 21. The control unit controls both the pump 22 via the control connection 24 and also the valve 16.1 of group G1 via the control connection 25.1 and the valve 16.2 of group G2 via the control connection 25.2. When the control unit 19 opens the valve 16.1, fluid thus reaches the outlet nozzles 15.1, 15.2 and 15.3 simultaneously via the water beam 20.1. The triggering of a fluid blast by the control unit 19 by opening the valve 16.1 thus simultaneously affects the three outlet nozzles 15.1, 15.2 and 15.3. The same applies to the valve 16.2, the water beam 20.2 and the outlet nozzles 15.4 to 15.6. The cleaning function triggered by the control unit 19 now occurs in the manner that it activates the pump 22 at first, whereupon a pressure is built up in the entire line system 17 between the pump 22 and the valves 16.1 and 16.2. In order to produce the fluid blast, the control unit opens the valves 16.1 and 16.2 in an alternating fashion, thus leading to the generation of a simultaneous fluid blast on the outlet nozzles 15.1 to 15.3 of group G1 and 15.4 to 15.6 of group G2.

Figure 5A:
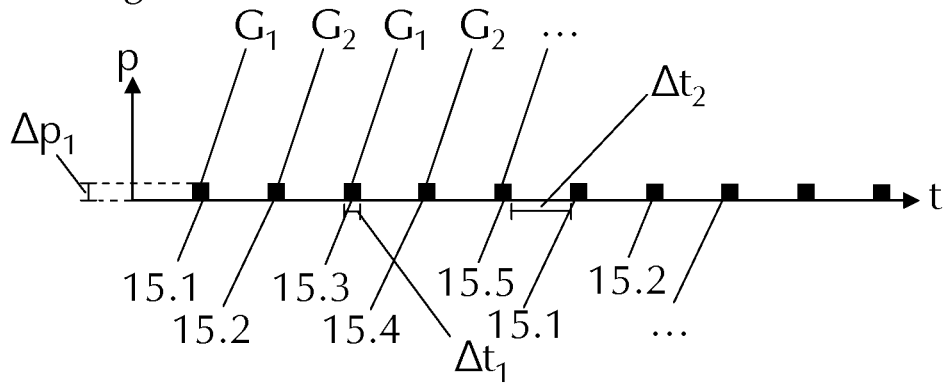
FIGS. 5a, 5b and 5c show different embodiments of the cleaning function.
Figure 5B:
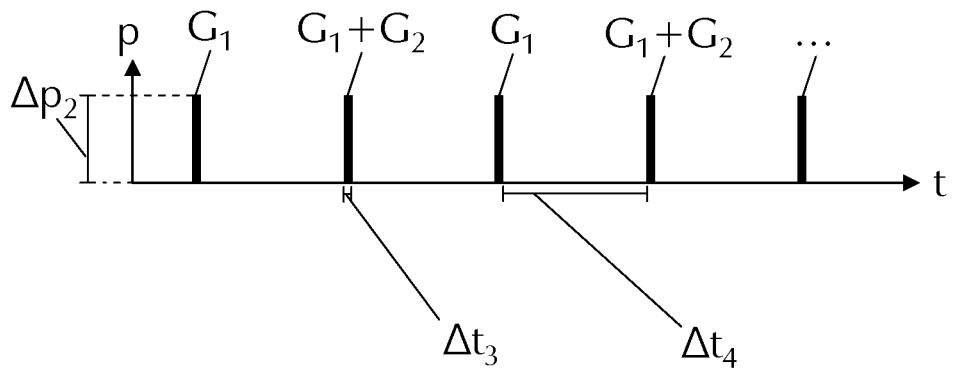
Figure 5C:
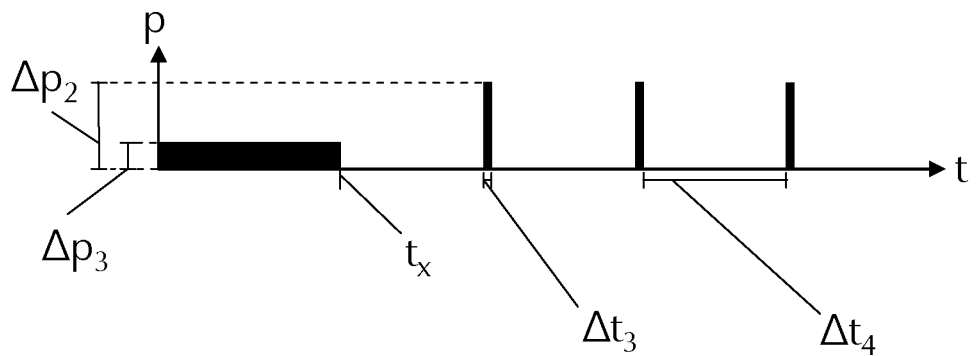

FIGS. 5a, 5b and 5c finally show various operating modes of the cleaning function of the control unit 19 and illustrate the settings by means of which adjustments of the cleaning function to changing ground materials can be achieved for example. FIGS. 5a to 5c are graphs, the abscissa of which is a time ray on which progressing time t extends from the left to the right. The ordinate on the other hand shows the pressure p of a fluid blast when passing through an outlet nozzle. The fluid blasts in FIG. 5a therefore have a length $t_1$. The time interval $t_2$ lies between two successive fluid blasts. With respect to the embodiment of the spraying device of FIG. 3, the control unit is arranged in the manner that it opens at first the valves of group G1 (valves 16.1 and 16.2) for a time $t_1$. After the expiration of the time $t_1$, the valves of group G1 are closed again. After the expiration of time $t_2$ which follows the time $t_1$, the valves 16.3 to 16.5 of group G2 are opened and a fluid blast passes through the outlet nozzles 15.3 to 15.5. After the expiration of a time $t_1$, the valves of the group G2 are closed again and the control unit then triggers the opening of the valve 16.1 and 16.2 of group G1 again after the expiration of a further time interval $t_2$, so that a renewed fluid blast passes through the outlet nozzles 15.1 and 15.2. The groups G1 and G2 are thus triggered successively and in an alternating manner by the control unit 19, so that a fluid blast is produced in the respective outlet nozzles in the groups G1 and G2 in an alternating fashion. This is illustrated by the upwardly disposed reference numerals $G_1$ and $G_2$ in FIG. 5a. As long as the cleaning function is activated by the control unit 19, this alternating cleaning function in the outlet nozzles continues with the interval-like breaks.

It is further possible in the alternative of the embodiment of FIG. 3 as described in paragraph [0040] to trigger the valve 16.1 to 16.5 individually and successively. This variant of triggering by the control unit 19 is shown beneath the abscissa in FIG. 5a. According to this, the control unit 19 triggers valve 16.1 first, leading to a fluid blast on the outlet nozzle 15.1 over the time $t_1$. The control unit 19 then closes valve 16.1 again. After the time interval $t_2$ the control unit 19 opens the valve 16.2, by means of which a fluid blast is produced in the outlet nozzle 15.2 over the time $t_1$, etc. Once the control unit 19 has passed through valve 16.1 to 16.5 successively according to the pattern as described above, it starts again with valve 16.1. Control unit 19 thus controls the individual valves in a rolling or cyclic manner, leading in regular intervals to repetitive and individual production of a fluid blast on the individual outlet nozzles.

FIG. 5b shows an alternative setting of the cleaning function in control unit 19. The output pressure $p_2$ of the fluid blast is substantially higher in comparison with the output pressure $p_1$ of the fluid blast in FIG. 5a. Moreover, the interval $t_1$ of the fluid blast is reduced and the distance between two fluid blasts $t_2$ is increased. The triggering mode has further been changed in the respect that the control unit triggers in an alternating manner the group $G_1$ alone and then the groups $G_1$ and $G_2$ together. This variant will be used when the risk of clogging of the respective at least one outlet nozzle in group $G_1$ is substantially higher than in group $G_2$. Further adjusting alternatives which are not provided further in FIG. 5b extend to the use of various fluids, the activation of the cleaning function also in working operation of the working roller 11, etc.

In the embodiment according to FIG. 5c, there is a particular aspect in the respect that the control unit 19 activates the cleaning function only in "dry operation" of the working roller 11. In "wet operation" of the working roller 11, the pump is activated permanently and the respectively provided valves are more or less permanently opened, so that a considerable quantity of fluid is introduced into the working chamber and is mixed with the ground material to be processed. In wet operation, a bonding agent such as lime which is to be applied to the ground to be processed in advance for example can be wetted with sufficient water. The quantity of the introduced fluid far exceeds the quantity of fluid to be introduced within the scope of the cleaning function into the ground material to be processed. In "dry operation" on the other hand, no quantities of fluids worth mentioning are introduced into the working chamber. The fluid quantity which is introduced during activated cleaning function over a fixed period of time in dry operation into the working chamber corresponds at most to one-tenth of the fluid introduced into the working chamber in the same period of time during wet operation.

FIG. 5c shows wet operation at first on the left, in which fluid is pumped continuously under pressure $p_3$ into the working chamber via the at least one outlet nozzle. At time $t_x$ however "wet operation" is switched off and "dry operation" is activated. In order to also prevent clogging of the provided outlet nozzles with ground material to be processed in "dry operation", a timer function of the control unit starts after deactivating wet operation and triggers a first fluid blast after the expiration of a time interval $t_2$ (starting with the deactivation of the "wet operation" at time $t_x$). The control unit 19 is thus arranged in the embodiment according to FIG. 5c in such a way that it automatically activates the cleaning function after deactivating "wet operation". Individual intervention of the machine operator is thus not required in this embodiment.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A spraying device for introducing a fluid into a working chamber of a construction machine for processing ground or road surfaces, comprising:
   at least one outlet nozzle configured to introduce the fluid into the working chamber;
   a line system configured to convey the fluid to the at least one outlet nozzle;
   a control unit configured to control a fluid supply to the outlet nozzle, wherein the control unit is configured in a manner that it controls a cleaning function of the at least one outlet nozzle in such a way that it triggers a fluid blast in intervals for cleaning the at least one outlet nozzle; and
   the control unit is further configured in a manner that it controls the cleaning function of the at least one outlet nozzle in such a way that it checks whether the at least one outlet nozzle is inactive, and triggers a fluid blast of the cleaning function only when the at least one outlet nozzle is inactive.

2. A spraying device according to claim 1, wherein the control unit is configured in a manner that a length ($t_1$) of the fluid blast lies in a range of between 0.1 and 30 seconds.

3. A spraying device according to claim 1, wherein the control unit is configured in a manner that a time interval ($t_2$) between two successive fluid blasts lies in a range of between 5 seconds and 5 minutes.

4. A spraying device according to claim 1, wherein the control unit is configured in a manner that it controls the cleaning function on the at least one outlet nozzle depending on an operating state of the at least one outlet nozzle.

5. A spraying device according to claim 1, wherein at least one of the following parameters is controllable in the control unit:
   length ($t_1$) of the fluid blast for cleaning;
   time interval ($t_2$) between two successive fluid blasts;
   fluid pressure during a fluid blast, and
   source of fluid used during the fluid blast.

6. A spraying device according to claim 1, wherein the fluid is a liquid comprising at least one of a bonding agent or water.

7. A spraying device according to claim 6, wherein the control unit controls the cleaning function in a manner that the fluid of the cleaning function comprises water.

8. A spraying device according to claim 1, wherein at least one further outlet nozzle is provided in addition to the at least one outlet nozzle, with the control unit being configured in a manner that it also includes the at least one further outlet nozzle in the cleaning function.

9. A spraying device according to claim 8, wherein the control unit is configured in a manner that it triggers the outlet nozzles individually for a closed-loop control of the cleaning function.

10. A spraying device according to claim 8, wherein the control unit is configured in a manner that it triggers the outlet nozzles in groups for a closed-loop control of the cleaning function.

11. A spraying device according to claim 8, wherein the control function is configured in a manner that it triggers the outlet nozzles jointly for a closed-loop control of the cleaning function.

12. A spraying device according to claim 1, wherein the line system comprises a water beam, on which at least two outlet nozzles are arranged.

13. A spraying device according to claim 1, wherein at least one valve is present which is triggered by the control unit during the cleaning function.

14. A spraying device according to claim 8, wherein each of the outlet nozzles is provided upstream with one respective valve, with the control unit being configured in a manner that it triggers each valve separately.

15. A construction machine for processing ground or road surfaces, comprising a spraying device according to claim 1.

16. A method for operating a spraying device of a construction machine according to claim 15, wherein the method comprises at least the following steps:
   a) triggering of a fluid blast by the control unit for cleaning the at least one outlet nozzle;
   b) repeating step a) after the expiration of a fixed time interval ($t_2$);
   c) checking whether the at least one outlet nozzle is inactive; and
   d) triggering the fluid blast of the cleaning function by the control unit only when the at least one outlet nozzle is inactive.

17. A method for operating a spraying device of a construction machine according to claim 16 with the spraying device having a plurality of outlet nozzles, wherein the method further comprises the step of simultaneously triggering of the fluid blast in at least two outlet nozzles or at least two groups (G1, G2) of outlet nozzles.

18. A spraying device according to claim 2, wherein the length ($t_1$) of the fluid blast lies in a range of between 1 and 20 seconds.

19. A spraying device according to claim 2, wherein the length ($t_1$) of the fluid blast lies in a range of between 2 and 15 seconds.

20. A spraying device according to claim 3, wherein the time interval ($t_2$) between two successive fluid blasts lies in a range of between 10 seconds and 3 minutes.

21. A spraying device according to claim 3, wherein the time interval ($t_2$) between two successive fluid blasts lies in a range of between 20 seconds and 1 minute.

22. A construction machine according to claim 15, wherein the construction machine comprises one of a milling machine for milling off road and ground surfaces, a stabilizer for stabilizing ground of low bearing capacity or a recycler for repairing pavements in need of repair.

* * * * *